United States Patent [19]

Crowe et al.

[11] Patent Number: 4,574,050

[45] Date of Patent: Mar. 4, 1986

[54] METHOD FOR PREVENTING THE PRECIPITATION OF FERRIC COMPOUNDS DURING THE ACID TREATMENT OF WELLS

[75] Inventors: Curtis W. Crowe; Charles M. Maddin, both of Tulsa, Okla.

[73] Assignee: Dowell Schlumberger Incorporated, Tulsa, Okla.

[21] Appl. No.: 756,913

[22] Filed: Jul. 18, 1985

Related U.S. Application Data

[63] Continuation of Ser. No. 397,008, Jul. 9, 1982, abandoned, which is a continuation of Ser. No. 131,298, Mar. 18, 1980, abandoned.

[51] Int. Cl.<sup>4</sup> ............................................. E21B 43/27
[52] U.S. Cl. ................................ 252/8.55 C; 166/307
[58] Field of Search ...................... 252/8.55 C, 174.18, 252/174.19, DIG. 11; 166/307

[56] References Cited

U.S. PATENT DOCUMENTS

| | | | |
|---|---|---|---|
| 2,175,081 | 10/1939 | Grebe | 252/8.55 |
| 3,686,123 | 8/1972 | Hiroshi | 252/87 |
| 4,160,483 | 7/1979 | Thomas et al. | 252/8.55 X |
| 4,167,214 | 9/1979 | Street | 166/307 |
| 4,199,469 | 4/1980 | Walzer | 252/87 X |

FOREIGN PATENT DOCUMENTS 47-25078 10/1972 Japan .

Primary Examiner—Herbert B. Guynn
Attorney, Agent, or Firm—L. Wayne White

[57] ABSTRACT

The formation and subsequent precipitation of undesirable ferric compounds during the acid treatment of wells is substantially eliminated by incorporating in said treating acid an inhibiting amount of a monobasic alkanoic and/or alkenoic acid having at least four carbon atoms and bearing at least two alcoholic hydroxyl groups per molecule, and/or a soluble salt or γ-lactone of said acid. E.g. ascorbic acid or erythorbic acid.

9 Claims, No Drawings

METHOD FOR PREVENTING THE PRECIPITATION OF FERRIC COMPOUNDS DURING THE ACID TREATMENT OF WELLS

CROSS-REFERENCE TO RELATED APPLICATION

This is a continuation of application Ser. No. 397,008, filed July 9, 1982 which is continuation of application Ser. No. 131,298, filed Mar. 18, 1980, both now abandoned.

BACKGROUND OF THE INVENTION

1. Field of the Invention

This invention pertains to methods of substantially eliminating problems arising from the presence of ferric ions which occur during the acidization of wells.

2. Description of the Prior Art

Various acids have long been used to increase the permeability of a formation surrounding a wellbore. In these treatments, the acid is normally pumped from the surface through iron pipe under pressure into the formation to dissolve various parts of the formations. Such acid treatments have been particularly effective in calcareous formations and have been effective in increasing the production of oil, gas, brine, or even water wells.

During such acid treatments, the treatment acid dissolves iron scale in pipes and iron-containing minerals in the formation. The dissolved iron normally remains in solution until the acid is spent. Upon spending, ferric hydroxide begins to precipitate and plug the formation. Complete precipitation of ferric hydroxide is reached at a pH of about 3.2. Ferrous hydroxide, being more soluble, does not begin to precipitate until a pH of approximately 7.7 and is not generally a problem.

The deleterious effects of ferric hydroxide in wells was recognized by Grebe in U.S. Pat. No. 2,175,081 as early as 1937. Grebe used a strong acid containing sulphurous acid to counter the precipitation problem.

Numerous other procedures have been proposed for avoiding the ferric hydroxide problem. For example, U.S. Pat. No. 2,175,095 suggests including within the acidizing fluid a material such as lactic acid, ammonium acetate, glycine, glycolic acid, citric acid, or the like, which is capable of preventing the precipitation of iron or aluminum hydrates at normal precipitation pH values. U.S. Pat. No. 2,335,689 suggests adding an iron sequestering agent, such as a polyhydric phenol within the injected acids. U.S. Pat. No. 3,142,335 suggests the use of a sequestering agent containing a mixture of ingredients that function as a pH buffer, such as citric acid or a citrate salt mixed with acetic or formic acids or their salts. U.S. Pat. No. 3,150,081 suggests using mixtures of hydroxyacetic and citric acids; the mixtures are alleged to be cheaper and more effective than the use of either acid alone.

The most common iron sequestering agents in commercial practice are citric acid, ethylenediaminetetraacetic acid (EDTA), nitrilotriacetic acid (NTA), acetic acid, lactic acid, and citric acid/acetic acid mixtures. Data on these sequestering agents is found in the paper by Smith et al., Paper No. SPE 2358, Society of Petroleum Engineers of AIME, (presented Nov. 7-8, 1968).

The problem with most iron sequestering agents is that they are not particularly effective at temperatures beyond about 125°-150° F. Only NTA, citric acid and EDTA have shown any effectiveness at higher temperatures. And of these, EDTA is the only practical sequestering agent because citric acid tends to form insoluble citrates during the course of the well treatment. Such citrates can block the well production almost as effectively as the ferric hydroxide.

The presence of ferric ions in the treatment acid solution is known to cause other serious problems as well. For example, U.S. Pat. No. 4,096,914 teaches that ferric iron reacts with asphaltenic oil to form insoluble ironasphaltene compounds. These compounds are insoluble precipitates which likewise plug the formation channels and inhibit production of the desired fluid. The patent teaches that the problem can be solved by incorporating salicylic acid into the treatment acid.

Ferric ion corrosion can also be a problem. Each mole of ferric ion reacts with base metal to form two moles of ferrous ion. Almost any oxidizing source readily converts the ferrous ions to ferric ions, and a vicious circle results. Additives used to control problems associated with ferric ions in treatment of wells have been called "iron stabilizers" by practitioners in the field.

So the state of the art is such that there is a substantial need to prevent the formation of ferric ions during acid treatment of wells and there is a particular need to prevent the formation and precipitation of ferric compounds as the acid spends.

SUMMARY OF THE INVENTION

A method has now been discovered for preventing the undesirable formation and precipitation of ferric compounds from spent acid solutions containing dissolved iron following the acidizing treatment of subterranean formations surrounding wellbores. The new method comprises adding to the treating acid, prior to contact with the formation, an inhibiting amount of monobasic alkanoic and/or alkenoic acid having at least four carbon atoms and bearing at least two alcoholic hydroxyl groups per molecule, and/or a soluble salt or γ-lactone of said acid.

The ungelled aqueous acid compositions useful herein are also novel compositions of matter. Such ungelled aqueous acid compositions comprise an aqueous acid at a pH less than about 1.5, and an inhibiting amount of a soluble monobasic alkanoic and/or alkenoic acid, having at least four carbon atoms and bearing at least two alcoholic hydroxyl groups per molecule, and/or a soluble salt or γ-lactone of said acid, (such as ascorbic acid and/or erythorbic acid, and/or a soluble salt thereof) in an amount sufficient to inhibit the formation and precipitation of ferric compounds in said treatment acid during conditions of use and in the spent treatment acid.

DETAILED DESCRIPTION OF THE INVENTION

The novel inhibitors used herein are a known class of organic compounds, each member of which is suitable for use herein so long as the selected compound(s) is compatible with the treatment acid or treatment acid system and is effective in inhibiting the production of ferric ions and/or is effective in inhibiting or preventing the formation and precipitation of insoluble ferric compounds during conditions of use. Members of this known class of compounds include ascorbic acid, erythorbic acid and other isomers of the general formula

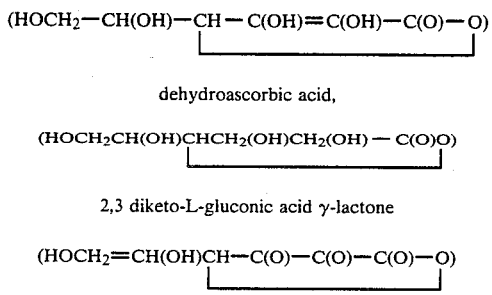

dehydroascorbic acid, (HOCH₂CH(OH)CHCH₂(OH)CH₂(OH) — C(O)O)

2,3 diketo-L-gluconic acid γ-lactone (HOCH₂=CH(OH)CH—C(O)—C(O)—C(O)—O)

and the corresponding acid, threonic acid (HOCH$_2$CH(OH)C(OH)—COOH), and the like. In many instances, it is a procedural advantage to add such inhibitors to the treatment acid as the alkali metal or ammonium salts thereof because of the faster dissolution rate of the salts. Of course, when the salts are dissolved in the treatment acid, the salts are converted to the corresponding organic acid. The novel inhibitors are added in an amount sufficient to substantially inhibit or prevent the formation of ferric ions and/or the formation and precipitation of insoluble ferric compounds during conditions of use. Normally, the inhibitors will be added in an amount of from about 0.1 to about 400 pounds of inhibitor per 1,000 gallons of treatment acid. Preferred limits normally are from about 1 to about 100 pounds per 1,000 gallons of treatment acid. The preferred inhibitors are ascorbic acid and erythorbic acid, with erythorbic acid being the most preferred.

The treatment acid can be any of the conventional treating acids. Examples of such acids include hydrochloric acids, fluoboric acid, hydrofluoric acid, hydrochloric/hydrofluoric acid mixtures, sulfamic acid, formic acid, acetic acid, hydroxyacetic acid, and the like. Mixtures of acids are used in many instances and are also suitable for use herein. Preferred treating acids are hydrochloric acid, HCl/HF mixtures known as mud acid, and fluoboric acid. The most preferred treatment acid is hydrochloric acid at concentrations of from about 5 to about 15 weight percent and mud acid which is typically a mixture of about 12 percent hydrochloric acid and about 3 percent hydrofluoric acid. The aqueous treating acid used in the present invention can be substantially any which is capable of dissolving solid materials located within a subterranean earthen formation in a manner which increases the permeability of that formation and it can be either a solution or a homogeneous dispersion in which the aqueous water phase is an aqueous acid. The oil phase of such acid dispersions is usually a liquid hydrocarbon, such as light petroleum crude oil, tolnene, etc. which is compatible with the formation. Such dispersions have been reported by Kiel in a variety of patents. In many instances, these dispersed acids (or acid dispersions) have very desirable viscosity properties. Viscosity of acid treating solutions can also be adjusted by the incorporation of various thickening agents (e.g. polysaccharides, galactomannans, xanthan gums, etc.). The use of the instant inhibitors and treatment acids thickened with xanthan gums is particularly effective due to the unique nature of such formulations. Such formulations are the subject matter of a co-pending commonly owned patent application submitted even date herewith by C. W. Crowe, the subject matter of which is incorporated herewith by the reference (Ser. No. 131,296 filed Mar. 18, 1980 and issued as U.S. Pat. No. 4,317,735).

Other conventional additives can be included in the instant formulations as desired. Acid corrosion inhibitors are typically included in treatment acids and are beneficial in the instant method as well. Such acid corrosion inhibitors are known classes of compounds and include, for example, acetylenic alcohols, nitrogen-based corrosion inhibitors, etc. and have been amply described in the prior art.

In the practice of the instant invention, the novel inhibitors will be formulated with the treatment acid (and any optional additives) at the surface and injected into the well by conventional techniques. Since at least a substantial quantity of the ferric ions are usually derived from contact of the treatment acid with iron process equipment used in making or handling the acid or the wellbore pipelines, it is clearly desirable that at least the first injected portion of the treatment acid contain enough of the novel inhibitor to offset such ferric ions initially. Treatment acid without the present inhibitors can be subsequently injected into the well following the initial inhibited acid provided that the treatment acid itself is substantially free of ferric ions and the formation has few iron-containing compounds. In many acidizing treatments, the initial volume of treatment acid is preceded and/or followed by other fluids (e.g. dilute ammonium chloride) which do not react with the iron scale to produce ferric ions. These fluids are used to establish injectivity and/or provide a spacer between treatment fluids in most instances. Such techniques are likewise suitable for use with the instant ferric inhibited acids.

Where the subterranean formation being treated is relatively unconsolidated, the procedure for injecting acidizing fluids and returning the well to production can advantageously be that described by U.S. Pat. No. 3,948,324. Where the formation is siliceous and its permeability may be impaired by clay or silica fines, at least a portion of the acidizing acid should be a mud acid (normally containing 12 percent hydrochloric and 3 percent hydrofluoric) and may include pretreatment slugs of ammonium chloride. The treatment of formations containing clay and siliceous fines is maximized by the processes of Thomas in U.S. Pat. Nos. 4,151,878 and 4,151,879. If the Thomas procedure(s) is followed, the present ferric inhibitors can be included in the initial treatment acid or in both the initial treatment acid and any or all of the following fluids, including the fluoboric acid.

EXPERIMENTAL

The following examples further illustrate the invention.

EXAMPLES 1-2

A series of tests was conducted by spending treatment acid solutions (15 percent aqueous hydrochloric acid) containing 8000 milligrams of dissolved ferric ion per liter of acid on Indiana limestone for 18 hours at 150° F. The blank contained no ferric inhibitor. Examples 1 and 2 contained ascorbic acid and erythorbic acid, respectively at a concentration of 2400 mg/l (i.e. 20 pounds per 1000 gallons) of treatment acid. In examples 1 and 2, the dissolved iron was retained in solution as ferrous ($Fe^{+2}$) iron and very little, if any, ferric hydroxide precipitated. The blank contained very little dissolved iron and copious quantities of insoluble ferric hydroxide. The results are summarized in Table I.

TABLE I

| Ex. | Dissolved iron ($Fe^{+2}$, mg/l) |
| --- | --- |
| Blank | 140 |
| 1 | 5600 |
| 2 | 5500 |

Similar results were obtained in tests conducted at 100°, 125°, 150° and 200° F. By way of comparison, it took almost 16–20 times as much citric acid, EDTA, or acetic acid (on a per weight basis) to achieve essentially the same result. Both ascorbic and erythorbic acid are substantially less expensive on a cost performance basis than EDTA, so the present invention has potential economic advantages as well as substantial technical advantages.

What is claimed is:

1. A method for preventing the undesirable formation and precipitation of ferric compounds from a spent treatment acid containing dissolved iron following an acidizing treatment of subterranean formations surrounding a wellbore, said method comprising adding to said treatment acid prior to contact with the formation an amount of ascorbic acid and/or erythorbic acid, and/or a soluble salt of said acid, sufficient to prevent the formation and precipitation of ferric compounds from the treatment acid upon spending.

2. The process of claim 1 in which the aqueous acid is hydrochloric acid, HCl/HF mixtures or fluoboric acid.

3. The method defined by claim 2 wherein said aqueous acid is about 15 percent hydrochloric acid or a mixture of about 12 percent hydrochloric and about 3 percent hydrofluoric acid.

4. The method defined by claim 3 in which said acid is erythorbic acid.

5. An ungelled aqueous treatment acid composition having chemical and physical properties rendering it suitable for use in acidizing subterranean formations to increase the permeability thereof, said composition consisting essentially of (a) an aqueous acid medium having about 15% hydrochloric acid, a mixture of about 12 percent hydrochloric acid and about 3 percent hydrofluoric acid or fluoboric acid as the sole inorganic acid component thereof, and (b) ascorbic acid and/or erythorbic acid, and/or a soluble salt of said acid, in an amount sufficient to inhibit the formation and precipitation of ferric compounds in said treatment acid composition during conditions of use and in the spent treatment acid.

6. The composition defined by claim 5 wherein said aqueous acid is about 15 percent HCl and (b) is erythorbic acid.

7. The composition defined by claim 5, in which (b) is erythorbic acid.

8. In the method of increasing the permeability of a subterranean formation penetrated by a wellbore by injecting through said wellbore and into the formation adjacent thereto an acidizing fluid, the improvement comprising using the composition defined by claims 5 or 7 as said acidizing fluid.

9. In the method of increasing the permeability of a subterranean formation penetrated by a well bore by injecting through said well bore and into the formation adjacent thereto an acidizing fluid, the improvement comprising adding to said acidizing fluid prior to contact with the subterranean formation an amount of ascorbic acid and/or erythorbic acid, and/or a soluble salt of said acid, sufficient to inhibit the formation and precipitation of ferric compounds in said acidizing fluid during conditions of use and in the spent acidizing fluid.

* * * * *